United States Patent Office 3,706,019
Patented Dec. 12, 1972

3,706,019
DEVICE FOR MEASURING ANGULAR POSITION OF THE ROTOR OF A SYNCHRONOUS ELECTRIC MOTOR AND A THYRATRON ELECTRIC MOTOR
Vladimir Grigorievich Eremenko, Moscow, U.S.S.R., assignor to Moskovsky Ordena Lenina Energetichesky Institut, Moscow, U.S.S.R.
Filed Mar. 11, 1970, Ser. No. 18,595
Int. Cl. H02k 29/00
U.S. Cl. 318—138    3 Claims

ABSTRACT OF THE DISCLOSURE

A device for measuring angular position of the rotor of a synchronous electric motor by virtue of variation of the value of the high-frequency current envelope, said current flowing through at least one phase winding of the motor that is connected to a high-frequency power supply source, wherein inserted into the electrical circuit formed by a motor phase winding and the high-frequency power supply source, is a low-frequency guard filter, whereas inserted into the electrical circuit formed by the motor phase winding and low-frequency power supply source, is a high-frequency guard filter.

A thyratron electric motor employs the contemplated device for measuring angular position of the rotor whose change over switch provides alternative connection of the motor phase winding to the high-frequency power supply source, is synchronized with the ring-type power switching arrangement of the motor.

---

The present invention relates to devices for measuring angular position of a synchronous electric motor and to thyratron electric motors wherein said device is utilized.

The invention may find its application for control of power switching arrangements of D.C. or A.C. electric motors as well as for control of co-phase rotation of synchronous electric motors.

Known heretofore are devices for measuring angular position of the rotor of a synchronous electric motor that incorporate a special rotor position transmitter, say of transformer or inductive type, located on the common shaft with the motor. Said devices are adapted to measure the enveloping value of H.F. current flowing through the windings of the rotor position transmitter.

Known in the present state of the art are also thyratron electric motors incorporating a multi-phase synchronous electric motor, a ring-type power switching arrangement adapted to switch current in the phases of the motor windings respective of the rotor position and a device for measuring angular position of the rotor which is of conventional design.

The disadvantage of said devices lies in the fact that used therein is a special rotor position transmitter which complicates the design and impairs the reliability thereof.

It is an object of the present invention to provide a device for measuring angular position of the rotor of a synchronous electric motor that would be simpler in design.

It is another object of the present invention to provide a thyratron electric motor which may be mounted in difficult to get places, say in gyroscopes, electric drills; etc.

According to the abovementioned and other objects the essence of the present invention lies in the fact that a device for measuring an angular position of the rotor of a synchronous electric motor by taking measurements of the enveloping value of H.F. current flowing at least through one motor phase winding connected to a H.F. supply source, and featuring a low-frequency guard filter inserted into its electrical circuit formed by a motor phase winding and a H.F. supply source, having inserted into the electrical circuit formed by a motor phase winding and a low-frequency supply source, a high-frequency guard filter.

It is expedient to so select the capacitance of the capacitor of a guard filter that the latter is in resonance with the minimum value of inductance of the phase winding on high frequency.

It is desirable that the device be provided with a change-over switch adapted to ensure alternative connection of phase windings to the H.F. power supply source and which This provides for the possibility of use a single-phase H.F. power supply source.

A thyratron electric motor incorporating a multi-phase synchronous electric motor, a ring-type switching arrangement adapted to switch current in the phase windings of the motor respective of the position of the rotor and a device for measuring angular position of the rotor of the motor that is adapted to control a ring-type power switching arrangement, utilizes, according to the present invention, the herein-contemplated device for measuring angular position of the motor's rotor whose change-over switch adapted to provide alternative connection of the motor phase windings to the H.F. power supply source and which is synchronized with a ring-type power switching arrangement of the motor.

A thyratron electric motor may feature a change-over switch which is adapted to provide alternative connection of the motor phase windings to a H.F. power supply source, made on magnetic amplifiers with a control winding of each magnetic amplifier being inserted into the circuit of a ring-type power switching arrangement, whereas the A.C. winding through the H.F. power supply source and a low-frequency guard filter is connected with its one end to the respective motor phase winding, while with its other end it is connected to a reference element which features a parallel-connected semiconductor key which in turn is connected to the aforementioned power switching arrangement.

It is expedient that with a view of increasing operating stability of the power switching arrangement by removing fault tripping caused by transient processes in the H.F. power supply source circuit provision be made of a locking circuit say RC circuit, introduced between the reference element and the key of the switching arrangement.

Other objects and advantages of the present invention will be more apparent from a detailed consideration of exemplary embodiments thereof with due reference to the accompanying drawings, wherein.

Figure 1:
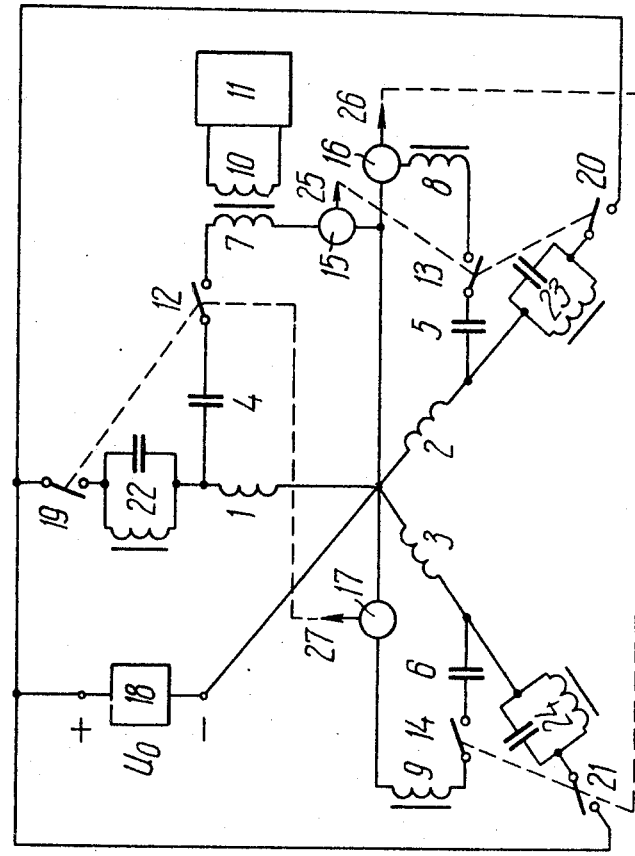
FIG. 1 represents a single-line diagram of a device for measuring angular position of the rotor of a synchronous electric motor operating as a non-commutator D.C. electric motor, according to the present invention.

The herein-contemplated device for measuring angular position of the rotor of a synchronous electric motor incorporates phase windings 1, 2 and 3 (FIG. 1) connected to which through capacitors 4, 5 and 6 are in fact, secondary windings 7, 8 and 9 of an isolating transformer, the primary windings 10 of the aforementioned isolating transformer being connected to a H.F. power supply source 11. Connected in series with the secondary windings 7 to 9 of the isolating transformer are switches 12, 13 and 14 of a change-over switch which is adapted to provide alternative connection of the phase windings 1, 2 and 3 of the motor to the power supply source 11, as well as null balance devices 15, 16 and 17 adapted to facilitate comparison of high-frequency current with the present value.

The L.F. power supply is in fact a D.C. voltage source 18 connected to the phase windings 1, 2 and 3 by means of switches 19, 20 and 21 of the switching arrangement. Inserted into the circuits formed by the D.C. voltage power supply source 18 and the phase windings 1, 2 and 3 are H.F. guard filters 22, 23 and 24 made as an inductance coil and a capacitor connected in parallel.

The switches 12, 13 and 14 of the change-over switch and the switches 19, 20 and 21 of the switching arrangement are connected pairwise, namely: the switch 12 is connected to the switch 19, the switch 13 is connected to the switch 20, and the switch 14 is connected to the switch 21. In this case each pair is synchronously switched over by a signal conveyed from the output terminals 25, 26 and 27 of the null balance devices 15 to 17.

With a view toward widening the range of H.F. current variations the capacitance of the capacitors 4, 5 and 6 is so selected that they be in resonance with the respective phase winding 1, 2 or 3.

Figure 2:
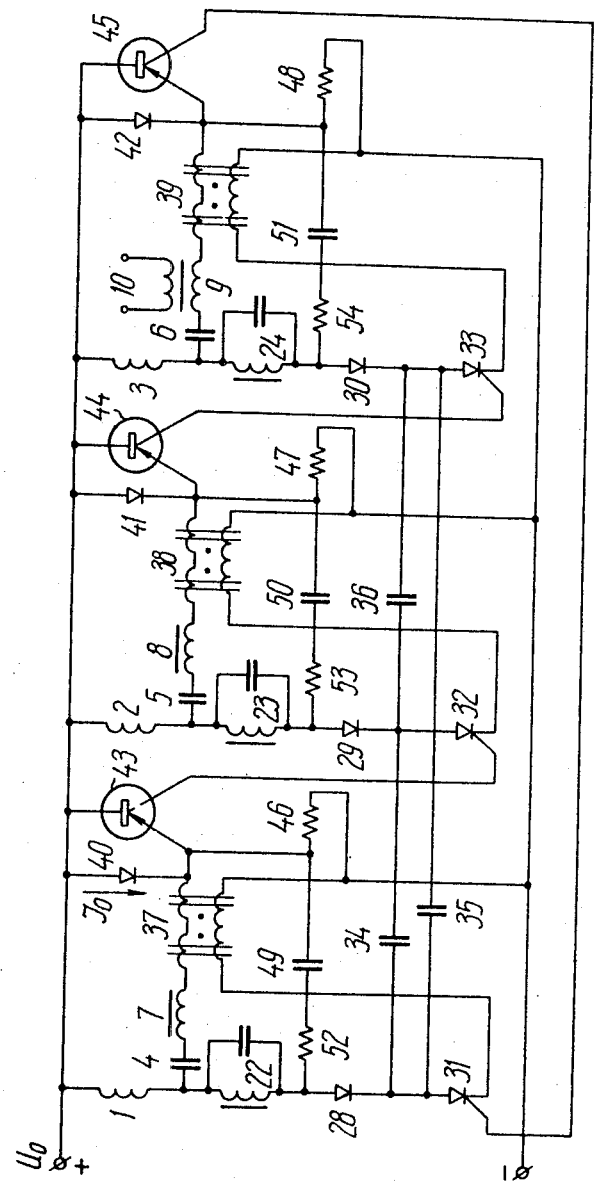
FIG. 2 shows a single-line diagram of a thyratron electric motor according to the present invention.

The advantages of the herein-disclosed device for measuring angular position of the rotor become more apparent when the latter is used in the circuit of a thyratron electric motor which incorporates a multiphase synchronous electric motor featuring phase windings 1, 2 and 3 (FIG. 2) connected to which through the capacitors 4, 5 and 6 which are low-frequency guard filters, are the secondary windings 7, 8 and 9 of the isolating transformer. The primary winding of the abovementioned isolating transformer is connected to the H.F. power supply source (not shown in FIG. 2). The power switching arrangement of the thyratron electric motor incorporates switching keys provided by diodes 28, 29 and 30 and thyristors 31, 32 and 33 with switching capacitors 34, 35 and 36.

The change-over switch adapted to provide alternative connection of the motor phase windings to the H.F. power supply source is based on magnetic amplifiers 37, 38 and 39 inserted into the circuit between the secondary windings 7 to 9 of the transformer and the reference elements, null elements, based on diodes 40, 41 and 42 with parallel-connected transistors 43, 44 and 45. The current value of the diodes 40 to 42 is set by resistors 46, 47 and 48.

Inserted between the diodes 40 to 42 and the diodes 28 to 30 in each phase are locking circuits which are essentially capacitors 49, 50 and 51 and resistors 52, 53 and 54 connected in parallel.

The principle of operation of the herein-disclosed device for measuring angular position of the rotor is based on the variation of inductive reactance of the phase winding of a synchronous electric motor for high frequency currents in the function of angle of rotation of the rotor with respect to the phase winding involved.

Assuming that the switches 12 and 19 are operative (FIG. 1), then flowing through the winding 1 of the motor will be the low-frequency current from the D.C. power supply source 18 and the high frequency current under the effect of the voltage across the secondary winding 7 of the transformer.

The value of the low-frequency current is much higher than that of the high-frequency current, therefore the electromagnetic moment of the motor in question will depend upon the interaction of the field of the motor's rotor (not shown in the drawing) and the low-frequency current component of the motor phase winding 1. Under the effect of the aforementioned moment the motor's rotor will tend to rotate with the result that the inductance of the motor phase will change with consequent change of the high-frequency current flowing through the null balance device 15. It is due to the guard filter 22 tuned in resonance on high frequency that the high frequency current does not flow through the D.C. power supply source 18, but is dependent upon the value of the inductance of the resistance of the motor phase winding 1.

The more is the difference between the inductive resistances along both the longitudinal axis $X_d$ and along the transverse axis $X_q$ of the motor the wider is the range of variation of the high-frequency current involved. With a view of widening the aforementioned range the capacitance of the capacitor 4 of the low-frequency guard filter is so selected that the latter be in resonance with the minimum value of the inductance of the motor phase winding 1.

Variation of the high-frequency current in question may be applied to measuring angular position of the rotor. Turning of the rotor by one polar scale division corresponds to one cycle of high-frequency current variation.

Figure 3:
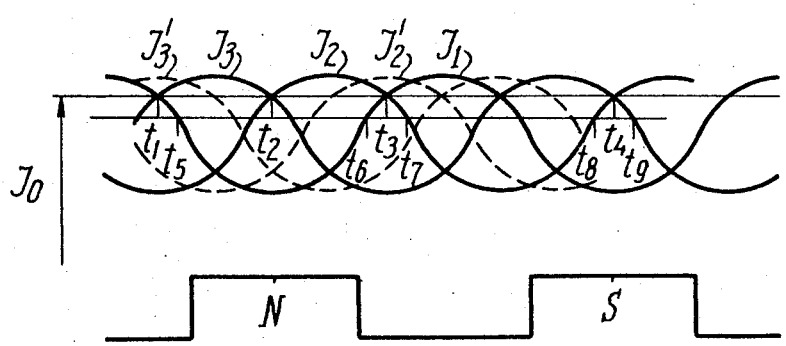
FIG. 3 represents curves characterizing variation of H.F. current envelope in various phase windings of the motor in the function—of an angle of rotation of the rotor thereof.

To obtain a signal characterizing the moment the motor's rotor passes through the present angular position, it is necessary to compare the high-frequency current with the preset current value and to register the moment both said values equal each other through the use of the null balance device 15, say the moment $t_3$ (FIG. 3) when the high-frequency current $I_1$ of the phase exceeds that of the preset current $I_0$.

Thus, by applying high-frequency voltage to one phase of the motor it is possible to register the moment the rotor passes only one point on the polar scale division of the machine.

When use is made of any method to measure angular position of the motor for control of the power switching arrangement of a thyratron electric motor it is necessary to fined intermediate points on the polar scale division biased by 60° or 120°. With this purpose in view use is made of the windings of other phases of the motor that are connected to a multiphase high-frequency power supply source through the corresponding filters, and the null elements similar to those shown in FIG. 1.

In this case at the output of the null balance devices 15, 16 and 17 there may appear the signals at the moments biased by 60° or 120° upon rotation of the motor's rotor. However, the multiphase high-frequency power supply source features a complicated design. Simultaneous connection of the single-phase high-frequency power supply source to the phase windings of the motor (the switches 12, 13 and 14 are concurrently closed) in case of reverse direction of the magnetizing forces of the three phases results in the disappearance of the phase current modulation upon variation of angular position of the rotor, whereas in case of the matching direction of the magnetizing forces of the three phases occurs a bias of the high-freuency current voltage $I_2'$ and $I_3'$ (FIG. 3) in two phases of the motor by 30°. This is due to the fact that the axis of the phase windings 2 and 3 (FIG. 3) in the last case will lie at the 60° angle to the axis of the resultant magnetizing force of the motor.

To avoid this the high-frequency voltage should be alternatively applied to the phase windings of the motor for which purpose the aforementioned switches 12, 13 and 14 are closed alternatively. In this current at a present value of the current $I_0$ (FIG. 3) the moments when said current equals the high-frequency current $I_1$, $I_2$, $I_3$ of three phases will be distributed throughout the angle of rotation of the rotor every 60°. When employing the herein-disclosed device for measuring angular position of the rotor in a circuit of a thyratron electric motor it is necessary to synchronize changing over of the switches 12, 13 and 14 (FIG. 1) with changing over of the switches 19, 20 and 21 of the power switching arrangement of the motor since in this case conditions for creating the maximum electromagnetic moment of the motor will be provided.

The motion of the rotor in this case is accompanied by the displacement of both the measuring high-frequency field and the low-frequency power electromagnetic field.

Represented in FIG. 1 is a diagram of the device for measuring angular position of a noncommutator D.C. electric motor wherein the inductive reactance $X_0$ along the longitudinal axis as less than the inductive reactance $X_q$ of the phase winding of the motor along the transverse axis ($x_d x_q$), say of the motor with the rotor featuring the permanent magnet of the "star" type with aluminium potting.

Assuming that the switches 12 and 19 were switched in at the moment $t_1$ (FIG. 3), in this case under the effect of the electromagnetic moment of the motor's motor will tend to rotate, the moment increases and will reach its maximum value when the conductors of the phase winding 1 (FIG. 1) will come under the polar axis since in the position corresponding to measurement of the inductive reactance along the transverse axis of the motor $X_q$. Since $x_d < x_q$ the current flowing through the series measuring circuit "motor winding 1, capacitor 4, transformer winding 7, null balance device 15" will be diminished. Due to the fact that the capacitor 4 is tuned in resonance with the inductive reactance $x_d$ the high-frequency current flowing through the longitudinal axis will decrease and the current $I_1$ will become less than the preset value of the current $I_0$.

When the rotor passes the moment $t_2$ the high-frequency current $I_1$ starts to increase and at the moment $t_3$ it will exceed the preset current $I_4$, there appears a signal at the output 25 of the null balance device 15, said signal switches in the switches 13 and 20 and switches out 19 and 12, whereupon the electromagnetic moment of the motor will rise again, the rotor rotates in the same direction whereas the working processes in the phase winding 2 will repeat until the signal at the output 26 of the null element 16 switches in the keys 14 and 21 and switches out the switches 13 and 20.

In the case of an electric motor wherein $x_d > x_q$ for maintaining the value of the electromagnet constant, the switches 19 and 13, 20 and 14, 21 and 12 are switched in simultaneously and the output 25 of the null balance device 15 must be connected with the pairs of the switches 19, 13, the output 26 of the null balance device 16 must be connected to the pairs of the switches 20, 14 and the output 27 of the null balance device 17 must be connected to the pairs of the switches 21, 12.

An experimental motor according to the invention has the following characteristics:

1, 2, 3 (see FIG. 2) are phase windings of the magnetoelectric motor. Power, 500 w.; number of pole pairs, 2; motor phase induction for the motor position corresponding to measuring $X_q$ (i.e. with the axes of the magnetizing forces of the stator and rotor are normal to each other) equals to 0.107 mH. When the rotor turns, the H.F. current in the measuring circuit, say in the circuits 1–4–7–37–40, 43, changes for 25 percent of its minimum value, i.e.

$$\frac{J_{max}}{J_{min}} = 1.25$$

The motor's rotor is a "star"-shaped permanent magnet with aluminum potting.

4, 5, 6 are capacitors of the low-frequency guard filters, type MbM, 0.25 μf.

7, 8, 9 are secondary windings of the transformer whose primary winding 10 is connected to a 30.5 kc./s. H.F. power supply source, accomplished from Royer's circuit. The voltage across the windings 7, 8 and 9 is 2 v.

22, 23, 23 are three high-frequency guard filters, each comprising a choke (L=0.107 mH.) wound on a Ш-shaped ferrite core with an air gap, and a capacitor, type MbM, 0.25 μf. connected in parallel. Resonance frequency of the filters 22, 23 and 24 is 30.5 kc./s.

28, 29, 30 are diodes of the ring-type power switching arrangement (д-305, J=a., $\overset{E}{V}$=50 v.)

31, 32, 33 are thyristors of the ring-type power switching arrangement (д-238 I, J=10 a., $\overset{E}{V}$=150 v.)

34, 35, 36 are switching capacitors of the ring-type power switching arrangement (Mb10, 30 μf., $\overset{E}{V}$=160 v.)

37, 38, 39 are change-over switches adapted to provide alternating connection of the motor phase windings 7, 8 and 9 of the H.F. transformer 10. Each change-over switch is made in the form of a magnetic amplifier and comprises two 10 mm. dia. ferrite cores with a square loop hysteresis. 80 coils of wire, dia. 0.15 mm.; comprising the A.C. winding, are wound on said core. The magnetic amplifier control winding enveloping both the cores has 5 coils of the IIB wire, 1.0 mm. in diameter.

40, 41, and 42 are diodes of the reference elements of the null elements (silicon diodes, type д826, J=1 a., $\overset{E}{V}$=47 v.)

43, 44, and 45 is semiconductor key connected in parallel with the reference element of the null element (germanium transistor p-n-p, type MII-26A, J=300 ma., $\overset{E}{V}$=40 v.)

46, 47, and 48 are resistors setting current value of the reference elements which are essentially diodes 40, 41, and 42, and consisting of two resistors connected in series: of a constant one, type MAT, 100 ohms, 1 w., and of a variable wire one, RC-25, 130 ohms.

49, 50, 51 are capacitors of the R-C locking circuit (tantalum electrolytic capacitor, type TC968-20 μf $\overset{E}{V}$=250 v.

52, 53, 54 are resistors of the R-C locking circuits (type BC, 2 w., 51 ohms).

Connected in series with thyristors 31, 32, and 33, during starting were 4-ohm starting resistors (not shown in FIG. 2) limiting the starting current to 5 a. The motor starting completed, the starting resistors are closed by the contacts of the three-circuit relay.

The motor features the following mechanical characteristics of a D.C. shunt wound electric machine:

Under a 24-v. supply the idle speed makes 8000 r.p.m., at the highest efficiency point equalling to 0.7. the speed is 5000 r.p.m.

The thyratron electric motor (FIG. 2) operates as follows.

When the motor starts to operate a trigger pulse is delivered to any thyristor of the power switching arrangement from a trigger device (not shown in the drawings). Switched into operation in this case is one phase of the motor, say the phase I, with the magnetic amplifier 37 whose control winding is inserted into the circuit of the thyristor 31 being saturated. The motor's rotor tends to occupy the position where the axes of both the magnetizing forces of the stator and rotor coincide. However, upon reaching said moment, i.e. time moment $t_3$ (FIG. 3), the high-frequency current of the measuring circuit of the motor phase exceeds the value of the current $I_0$ flowing through the diode 40 (FIG. 2) and starts to flow through the junction emitter-base of the transistor 43 thereby throwing it in conduction and delivering a control pulse to the thyristor 32 of the adjacent phase. The aforementioned thyristor becomes conducting, its current saturates the magnetic amplifier 38, the thyristor 31 is thrown out of conduction due to the operation of the switching capacitor 34. The motor moment thus developed is of the same sign as before, and the rotor rotates in the same direction. At the very first moment the thyristor 32 is involved in operation the charging current flowing through the locking circuit, which consists of the resistor 53 and the capacitor 50, increases the current of the diode 41 which precludes false conduction of the transistor 44. In this way these occurs ring switching over of the power and control circuits. The moments of the switching arrangement of the change-over switch of the device for measuring angular position of the rotor are switched over, and are registered by the current of the diodes 40 to 42. The reference element functions here as a power amplifier. The regulation of the speed of the motor is effected either by variation of constant voltage or by variation of the current of the reference element due to the variation of the resistance of the resistor 46 to 48.

In the case of economical regulation of the motor speed the control unit may be provided with additional reference element, whereas the power switching arrangement may be provided with additional switches adapted to disconnect the motor from the supply line (not shown in the drawing).

In this case the moments, when the phase windings 1 to 3 of the motor are involved in operation, alternate with the moments when the motor is completely disconnected from the supply line.

With a view toward increasing the efficiency of regulation, the middle of the time lapse when the phase is disconnected must agree with points $t_1$, $t_3$, $t_4$ with the axis of the phase and the axis of the motor's pole being mutually perpendicular. In this case the phases of the motor are switched in at the moments $t_5$, $t_7$, $t_9$ (FIG. 3) by the reference element whereas disconnection of the motor from the supply line and changing over of the change-over switch of the device for measuring angular position of the motor is effected by the main reference element at the moments $t_6$, $t_8$.

With this kind of regulation of the motor the switching arrangement and the change-over switch of the device for measuring angular position of the rotor are made separate because the measuring circuits of the aforementioned device for measuring angular position of the rotor must not be fully disconnected from the motor.

When employing said device for measuring position of the rotor no additional conductors are required except three of four.

Synchronous machines with different values of resistances along the longitudinal axis $x_d$ and the transverse axis $x_q$ find wide application, therefore the utilization of the herein-contemplated device in said machines provides the possibility to simplify the design thereof.

Though this invention has been described herein with reference to the preferable embodiment, it will be understood that minor changes in the details of the construction may be made without departing from the spirit and scope of the invention, as will be readily understood by those competent in the trade.

All these alterations and changes will be considered to remain within the spirit and scope of the invention and the claims that follow.

What is claimed is:

1. A thyratron electric motor incorporating a multiphase synchronous electric motor fed from a low-frequency power supply source, a ring-type power switching arrangement for switching current flowing through the phase winding of said motor depending upon the position of its rotor and a device for measuring angular position of the rotor of said motor that is adapted to control said ring-type power switching arrangement and incorporating; a high-frequency power supply source; a low-frequency guard filter connected with its input to the output of said high-frequency power supply source, whereas with its output it is connected to said phase winding of the motor; a high-frequency guard filter connected with its input to the output of said power supply source, whereas with its output it is connected to one of the aforementioned phase winding of the motor; a plurality of balance devices each of which is connected to one of the aforementioned phase winding and provides comparison of the high-frequency current flowing through a phase winding with a present value; a change over switch adapted to provide alternative connection of the phase windings of the motor to said high-frequency power supply source and synchronizeed with said power switching arrangement.

2. A thyratron electric motor as claimed in claim 1, wherein said change over switch provides alternative connection of the motor phase windings to said high-frequency power supply source, incorporating: magnetic amplifiers whose number equals to that of the phase windings; a control winding of each said magnetic amplifier that is inserted into the circuit of said ring type power switching arrangement; an A.C. winding connected to said high-frequency power supply source; a reference element connected to said A.C. winding; a semiconductor switch connected in parallel both to said reference element and connected to said power switching arrangement.

3. A thyratron electric motor as claimed in claim 2 comprising a locking circuit including an RC-circuit, inserted between said reference element and a switch for said power switching arrangement.

References Cited

UNITED STATES PATENTS

| | | | |
|---|---|---|---|
| 3,229,179 | 1/1966 | Hetzel | 318—138 |
| 3,419,782 | 12/1968 | Sheldrake et al. | 318—138 X |
| 3,453,512 | 7/1969 | Polakowski | 318—138 |
| 3,466,519 | 9/1969 | Platnick | 318—138 |
| 3,475,668 | 10/1969 | Mieslinger | 318—138 |
| 3,483,458 | 12/1969 | Kirk | 318—138 |

G. R. SIMMONS, Primary Examiner

U.S. Cl. X.R.

318—439, 254